Patented Feb. 13, 1951

2,541,384

UNITED STATES PATENT OFFICE 2,541,384

METHOD OF MAKING A LUMINESCENT ZINC SULFIDE

Siegfried Rothschild, London, England, assignor to The Hartford National Bank and Trust Company, Hartford, Conn., as trustee No Drawing. Application December 6, 1947, Serial No. 790,242. In Great Britain July 29, 1941

Section 1, Public Law 690, August 8, 1946
Patent expires July 29, 1961

13 Claims. (Cl. 252—301.6)

Among the different luminescent substances zinc sulphide activated with copper is still one of the most important. The spectrum of the luminescence of this material always shows a green band and in addition a blue band has often been observed. The figures given for the spectral position of the green band vary from 515 to 550 m$\mu$, the peak of the blue band has usually been observed at about 460 m$\mu$.

The invention relates to a method for the production of a luminescent copper activated zinc sulphide comprising the adjustment of the position of the green band in the spectrum of said zinc sulphide and of the relative intensities of the green emission to the blue emission by varying the amounts of free elemental sulphur or free metallic zinc present in the zinc sulphide before firing the same in an inert atmosphere and by adding different types of halide compounds according to whichever colour is desired.

As raw material for the production of zinc sulphide solutions of zinc salts are treated usually with hydrogen sulphide. The precipitate thus obtained is of a rather composite nature. It consists, not only of a more or less hydrated zinc sulphide, but free sulphur may also be present or sulphur compounds like thiosulphates. The material may furthermore contain in adsorption salts from the mother liquor. The presence of any of these substances in the precipitated zinc sulphide proved to be of a definite influence on the luminescent properties of the finished material. The same applies of course to zinc sulphide prepared by any other method than precipitation with hydrogen sulphide. The exact composition of the zinc sulphide has therefore to be ascertained, before it is used for the preparation of the luminescent material. Adsorbed salts and zinc oxide can be removed by washing with diluted acetic acid and subsequently with distilled water. The water adhering from the washing can be removed by heating the powder again, preferably in vacuum.

Presence of free sulphur in the zinc sulphide before firing tends to shift the peak of the green band to the blue part of the spectrum, while presence of metallic zinc moves the peak to the yellow part of the spectrum. The quantity of sulphur or zinc added should be sufficient to produce an atmosphere saturated with sulphur or zinc fumes round the sulphide particles, particularly during the first period of firing which means until the temperature reaches its maximum. The amount of sulphur or zinc necessary to produce a certain shift of the band depends entirely on the prevailing conditions, for example size of the muffle, shape of the crucible, tight fit of the crucible lid, the rate of heating and so on. Generally it has been observed that, with a material well enclosed in a crucible, about 5% sulphur or 5% zinc metal are sufficient to produce the maximum shifting. If a material has to be prepared which shows only the green band without, or with only a weakly developed, blue band an inert atmosphere, for example nitrogen, should be used.

The type of halide compounds added to the zinc sulphide before the firing is also of influence on the position of the green band and on the development of the blue band. Alkalihalides are favourable for a greenish shade, and earth-alkalihalides for the yellow green. Magnesium chloride increases the intensity of the blue band and diminishes the intensity of the green emulsion.

A material with a predominant blue emission is obtained by adding about 10% magnesium chloride. The position of the green band depends again on the presence of free sulphur or zinc and one of these elements is added according to whichever shade of colour is desired.

The effect of the presence of free sulphur or alternatively zinc metal may be understood by considering the reactions taking place during the firing:

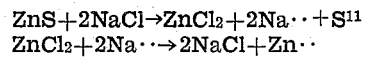

$$ZnS + 2NaCl \rightarrow ZnCl_2 + 2Na \cdots + S^{11}$$
$$ZnCl_2 + 2Na \cdots \rightarrow 2NaCl + Zn \cdots$$

It has to be assumed that these reactions are affected by the presence of an excess of either zinc or sulphur with the result that the finished crystallized material contains lattice disturbances of a different character depending on the addition of sulphur or zinc. It is further plausible from the formulas given above that the kind of halide salts used influences the luminescence. According to the modern theories about luminescence the existence of lattice defects produces new energy levels in the crystal structure. Light will be emitted by a jump of an electron into one of these additional levels. The wave length of the emitted light will depend on the differences in energy between these levels which accounts for the different positions of the peak of the green band in the spectrum and the appearance of a blue band.

The materials prepared according to the invention are excited to luminescence by light, cathode rays or by the radiation of radioactive substances. It is accordingly possible to prepare for instance a bluish luminescent radioactive substance with a bluish luminescent zinc sulphide prepared as described above.

In British specification No. 473,715 a method of preparing a layer of phosphorescent material has been described by heating pure zinc sulphide together with a flux to a temperature below the softening point of glass and for a time not exceeding half an hour, so that the greater part of the final product has the sphalerite structure and the smaller remaining part has the wurtzite structure. In the example given in said specification pure zinc sulphide is first heated together with pure sulphur up to 400° C. in a hydrogen atmosphere. This zinc sulphide, which substantially consists of cubic sphalerite is caused to luminesce by heating it again together with a flux as KCl for 10 minutes to about 400° C. During the second heating no special measures against oxidation are taken and air is therefore admitted.

The wurtzite/sphalerite ratio is of importance for the decay time of the material after irradiation, a high wurtzite content produces a long persistent afterglow, while a high sphalerite content contributes to a short afterglow. The position of the copper band seems however to be unaffected by the wurtzite/sphalerite ratio. The introduction of new energy levels in the crystal lattice as produced by the method according to the present invention is quite independent of the wurtzite/sphalerite ratio and no claim is made in the present invention for a method to define the luminescent properties by an adjustment of this ratio.

The heating of the zinc sulphide with sulphur in a hydrogen atmosphere as described in British specification No. 473,715 is carried out as a preliminary treatment before the activating metal and halide compounds are added, and before the firing, which provides the material with luminescent properties.

It is however an essential feature of the present invention, that during the firing process, which causes the zinc sulphide to luminesce, copper compounds as well as halide compounds are present simultaneously with elemental sulphur or zinc in an inert atmosphere. The effect of the sulphur or zinc on the spectral position of the copper band does not take place, when the zinc sulphide is first heated with sulphur or zinc only and then afterwards heated again with copper and halide compounds but without an addition of sulphur or zinc. The dissociation reactions described above, which also affect the copper compounds are influenced by the presence of elemental sulphur or zinc, and it is therefore not possible to produce the same effect by a heating process in two stages.

Furthermore any reheating of the copper activated zinc sulphide with admission of air affects the spectral distribution of the luminescence although it may not appreciably alter the wurtzite/sphalerite ratio. It has also to be pointed out that, when the heating of the zinc sulphide with sulphur as described in British specification No. 473,715 is carried out in a hydrogen atmosphere, a reaction between sulphur and hydrogen takes place with formation of hydrogen sulphide. The presence of hydrogen sulphide has however an effect on the spectrum of the luminescence of the zinc sulphide completely different from the effect of elemental sulphur as used in the present invention. But also this effect of hydrogen sulphide on the luminescence is only noticeable, when the firing is carried out in presence of the copper and halide compounds and not without these substances.

In said specification it is further stated that instead of alkali halides other halide compounds may be used which exert different influences on the durability of the phosphorescence of the material during operation. No reference is however made concerning the influence of such compounds on the spectral emission.

In British specification No. 492,923 a process for producing a zinc sulphide composition that remains phosphorescent for a lengthy period has been described characterized in that a content of zinc oxide in the end product amounting to about 2% is obtained. The material prepared according to the present invention does not contain any such amounts of zinc oxide after firing, on the contrary zinc oxide eventually present before the firing is removed and care has to be taken that no zinc oxide is formed while the firing is carried out.

The following non-limitative examples illustrate the preparation of luminescent zinc sulphides according to the present invention.

*Example 1*

Pure zinc sulphide is prepared by precipitation of a purified zinc solution. The washed and dried sulphide is washed with diluted acetic acid, subsequently with distilled water, until it is free from chlorides and any zinc salts. The sulphide is then dried preferably in vacuum and afterwards well mixed with about 5% S, 2% NaCl and 0.1% $CuCl_2$ on 1 kg. material. The mixture is filled in crucibles with a well fitting lid and heated up in 2 hours in an atmosphere of nitrogen to about 1100° C., then kept at this temperature for one hour in an atmosphere of nitrogen. The finished material shows a green luminescence with a peak at 520 m$\mu$.

*Example 2*

Pure zinc sulphide is prepared and analysed. Sulphur compounds like zinc thiosulphate are removed by washing with sodium carbonate solution. Zinc oxide is extracted as described in Example 1 and the material carefully dried. The sulphide is then mixed with about 5% zinc dust, 5% $BaCl_2$ and 1% NaCl, activated with copper, filled in crucibles with well fitting lids, gradually heated up to about 1200° C. and kept at this temperature in an atmosphere of nitrogen for 1 hour. The finished product shows a yellow-green luminescence with a peak at 545 m$\mu$.

*Example 3*

Zinc sulphide is prepared and treated as described in Example 2 but instead of $BaCl_2$ and NaCl 10% $MgCl_2$ crystallized is used.

The material shows a blue fluorescence with a preponderance of the blue band, the green band is only weakly developed.

The product has a short afterglow only.

I claim:

1. A process for the production of a luminescent zinc sulphide, comprising the steps of mixing zinc sulphide, a copper activator, a halide selected from the group consisting of the alkali metals and alkaline-earth metals, and less than about 5% of one of the elements constituting pure zinc sulphide, and heating the so formed mixture to the reaction temperature thereof in an inert atmosphere.

2. A process for the production of a luminescent zinc sulphide, comprising the steps of mixing zinc sulphide, a copper activator, a halide selected from the group consisting of the alkali metals and alkaline-earth metals, and less than about 5% of one of the elements constituting pure zinc sulphide, and heating the so formed mixture to the reaction temperature thereof in a nitrogen atmosphere.

3. A process for the production of a luminescent zinc sulphide, comprising the steps of mixing zinc sulphide, a copper activator, a halide selected from the group consisting of the alkali metals and alkaline-earth metals, and less than about 5% of one of the elements constituting pure zinc sulphide, and heating the so formed mixture to a temperature of about 1100° C. to about 1200° C. in an atmosphere of said element of pure zinc sulphide in volatile form.

4. A process for the production of a luminescent zinc sulphide, comprising the steps of mixing zinc sulphide, a copper activator, a halide selected from the group consisting of alkali metals and alkaline-earth metals, and less than about 5% of metallic zinc, and heating the so formed mixture to a temperature of about 1200° C. in an inert atmosphere.

5. A process for the production of a luminescent zinc sulphide, comprising the steps of mixing zinc sulphide, a copper activator, a halide selected from the group consisting of the alkali metals and alkaline-earth metals, and less than about 5% of sulphur, and heating the so formed mixture to a temperature of about 1200° C. in an inert atmosphere.

6. A process for the production of a luminescent zinc sulphide comprising the steps of mixing zinc sulphide, a copper activator, a halide selected from the group consisting of the alkali metals and alkaline-earth metals, and less than about 5% of metallic zinc, and heating the so formed mixture to a temperature of about 1200° C. in an atmosphere of volatile zinc.

7. A process for the production of a luminescent zinc sulphide, comprising the steps of mixing zinc sulphide, a copper activator, a halide selected from the group consisting of the alkali metals and alkaline-earth metals, and less than about 5% of sulphur, and heating the so formed mixture to a temperature of about 1100° C. in an atmosphere of volatile sulphur.

8. A process for the production of a luminescent zinc sulphide, comprising the steps of mixing zinc sulphide, a copper activator, a halide selected from the group consisting of the alkali metals and alkaline-earth metals, and less than about 5% of one of the elements constituting pure zinc sulphide, and heating the so formed mixture to a temperature of about 1100° C. to about 1200° C. in an inert atmosphere.

9. A process for the production of a luminescent zinc sulphide, comprising the steps of mixing zinc sulphide, a copper activator, an alkali halide, and less than about 5% of one of the elements constituting pure zinc sulphide, and heating the so formed mixture to a temperature of about 1100° C. to about 1200° C. in a nitrogen atmosphere.

10. A process for the production of a luminescent zinc sulphide comprising the steps of mixing zinc sulphide, a copper activator, an alkali-earth halide, and less than about 5% of one of the elements constituting pure zinc sulphide, and heating the so formed mixture to a temperature of about 1100° C. to about 1200° C. in a nitrogen atmosphere.

11. A process for the production of a luminescent zinc sulphide comprising the steps of precipitating zinc sulphide from a solution of a zinc salt, washing the so formed precipitated material with dilute acetic acid, washing the so acidified material with distilled water, drying the so washed material, mixing the so dried material with approximately 5% of sulphur by weight, approximately 2% of sodium chloride by weight, approximately 0.1% of copper chloride by weight, and heating the so formed mixture at approximately 1100° C. in an atmosphere of nitrogen.

12. A process for the production of a luminescent zinc sulphide comprising the steps of precipitating zinc sulphide from a solution of a zinc salt, washing the so formed precipitated material with sodium carbonate solution, washing the so treated material with dilute acetic acid, washing the so acidified material with distilled water, drying the so washed material, mixing the so dried material with approximately 5% of zinc dust by weight, 5% of barium chloride by weight, 1% of sodium chloride by weight, 0.1% of copper chloride by weight, and heating the so formed mixture at about 1200° C. in an atmosphere of nitrogen.

13. A process for the production of a luminescent zinc sulphide comprising the steps of precipitating zinc sulphide from a solution of a zinc salt, washing the so formed precipitated material with sodium carbonate solution washing the so treated material with dilute acetic acid, washing the so acidified material with distilled water, drying the so washed material, mixing the so dried material with approximately 10% magnesium chloride by weight, approximately 5% of zinc dust by weight, approximately 0.1% of copper chloride by weight and heating the so formed mixture at approximately 1200° C. in an atmosphere of nitrogen.

SIEGFRIED ROTHSCHILD.

REFERENCES CITED

The following references are of record in the file of this patent:

UNITED STATES PATENTS

| Number | Name | Date |
|---|---|---|
| 2,352,035 | Strubig | June 20, 1944 |

FOREIGN PATENTS

| Number | Country | Date |
|---|---|---|
| 473,715 | Great Britain | Oct. 19, 1937 |
| 492,923 | Great Britain | Sept. 29, 1938 |